United States Patent [19]

Kushida et al.

[11] Patent Number: 4,774,045

[45] Date of Patent: Sep. 27, 1988

[54] CONCRETE STRUCTURAL MEMBER AND METHOD FOR MANUFACTURE THEREOF

[75] Inventors: Shizuko Kushida; Takashi Tsubahara; Takafumi Naito, all of Tokyo; Seiji Kaneko, Kamakura; Yasunori Matsuoka, Yokohama; Takefumi Shindo, Tokyo, all of Japan

[73] Assignees: Ozawa Concrete Industry Co.; Taisei Corporation, both of Tokyo, Japan

[21] Appl. No.: 837,832

[22] Filed: Mar. 10, 1986

Related U.S. Application Data

[62] Division of Ser. No. 753,151, Jul. 9, 1985, abandoned.

[51] Int. Cl.4 .......................... B28B 1/16; B29C 39/12

[52] U.S. Cl. .................................... 264/256; 264/133; 264/DIG. 57

[58] Field of Search ............... 264/131, 133, 255, 256, 264/DIG. 57

[56] References Cited

U.S. PATENT DOCUMENTS

| | | | |
|---|---|---|---|
| 507,683 | 10/1893 | Lake | 404/31 |
| 2,579,050 | 12/1951 | Ramsay | 52/612 |
| 3,027,294 | 3/1962 | Bettoli et al. | 162/154 |
| 3,038,393 | 6/1962 | Nagin et al. | 404/31 |
| 3,070,557 | 12/1962 | Gessler et al. | 260/4 |
| 3,737,511 | 6/1973 | Dillon | 264/256 |
| 4,314,957 | 2/1982 | Ozawa | 264/102 |

*Primary Examiner*—Jan H. Silbaugh

*Assistant Examiner*—Karen D. Kutach

*Attorney, Agent, or Firm*—Oblon, Fisher, Spivak, McClelland & Maier

[57] ABSTRACT

A concrete structural member of improved stability is produced by preparing a concrete composite layer having a concrete layer on one side and an aggregate layer on the other side thereof, impregnating the composite layer with a monomer, thermally or catalytically polymerizing the monomer impregnated in the composite layer, and thereafter placing fresh concrete on the aggregate layer side of the polymer-impregnated composite layer.

4 Claims, 2 Drawing Sheets

CONCRETE STRUCTURAL MEMBER AND METHOD FOR MANUFACTURE THEREOF

This is a division of application Ser. No. 753,151, filed July 9, 1985, now abandoned.

BACKGROUND OF THE INVENTION

This invention relates to a concrete structural member having the surfface therof coated with a polymer-impregnated concrete layer and useful alone or in combination with other such members as girders, beams, structural blocks, retaining walls for aqueducts and dams, and various other items and to a method for the manufacture thereof.

DESCRIPTION OF THE PRIOR ART

It is widely known that concrete structural members for building and construction can be reinforced by having steel bars, metal frames, and precast steel pieces laid therein as reinforcement.

When such reinforcing materials corrode, however, they grow in volume and come off the surrounding concrete texture and gradually decay so much as to no longer fulfill the function of reinforcement. Thus, the reinforcing materials must be protected against corrosion.

Especially, concrete girders and beams used in railroads and roads for motorcars near coasts are exposed to breezes off the sea, and therefore, are liable to be infiltrated by corrosive agents such as chloride ion and sulfate ion and corrosive agents such as water and oxygen. As a result, steel bars and other reinforcing materials disposed therein have the possibility of undergoing corrosion and eventual deterioration.

To preclude this danger, these concrete structural members must be protected against penetration of such corrosive agents as moisture and oxygen. They are, further, required to be in a construction such as to thoroughly withstand weater conditions involving changes of temperature and humidity, chemical conditions ascribable to the actions of acids and alkalis, mechanical conditions liable to arise when the moisture contained is frozen and thawed, and service load.

Various concrete structural materials designed to withstand these harsh conditions have been proposed. Among other concrete structural materials, polymer-impregnated concrete materials prove to be most effective.

The polymer-impregnated concrete is produced by drying cured concrete, impregnating the dried concrete with a monomer to fill its capillary pores with the monomer, polymerizing the monomer in the capillary pores by exposure to radiation, or thermal-catalytic treatment and allowing the resultant polymer to bind the concrete texture (U.S. Pat. No. 4,314,957).

This polymer-impregnated concrete, however, has a few drawbacks. For example, the monomer is very expensive. If this monomer is made to impregnate all the capillary pores distributed throughout a concrete structural member, the concrete structural member finally turns out to be a commodity of very high price. If such costly concrete structural materials are used as retaining walls of large dimensions in aqueducts and dams or as girders and beams in roads, the construction turns out to be a project of prohibitive expense.

Further in the case of the polymer-impregnated concrete, when a concrete structural member is cured, it must be dried to remove the moisture from the capillary pores, and treated with the monomer in order for the monomer to impregnate the capillary pores in the concrete texture. If concrete structural members to be handled are in large dimensions, then the apparatus adopted for their treatment with the monomer is proportionately large and, as a result, the treatment for the impregnation with the monomer and the treatment for polymerization of the impregnated monomer are highly complicated. It is impracticable to manufacture this polymer-impregnated concrete easily, efficiently, and economically.

SUMMARY OF THE INVENTION

An object of this invention is to provide inexpensively and easily a concrete structural member which prevents penetration of corrosive agents such as moisture, oxygen, and chloride ion.

Another object of this invention is to provide inexpensively a concrete structural member which possesses high strength and chemical resistance.

To attain the objects described above, this invention provides a concrete structural member provided at a prescribed position thereof with a polymer-impregnated concrete layer by first molding a concrete layer having an aggregate layer on one side thereof, curing and drying the commposite concrete member, the impregnating the dry composite concrete member with a monomer and polymerizing the monomer impregnated therein, and finally placing concrete on the aggregate layer side of the polymer-impregnated concrete composite.

In accordance with this invention, the concrete structural member has only the side thereof susceptible to penetration by the corrosive agents or to heavy wear covered with the polymer-impregnated concrete layer. When the concrete structural members of this invention are used in the construction of a large-scale structure, therefore, the construction proves feasible economically. When the aggregate layer side of the polymer-impregnated concrete member is finally overlaid with a layer of fresh concrete, then hardening of the fresh concrete, the polymer-impregnated concrete member and the superposed layer of concrete are joined to each other so intimately as to defy separation.

BRIEF DESCRIPTION OF THE DRAWINGS

The other objects and characteristics of the present invention will become apparent from the further disclosure of the invention to be given hereinbelow with reference to the accompanying drawings.

DESCRIPTION OF PREFERRED EMBODIMENT

First, the method for manufacturing a concrete structural member incorporating a polymer-impregnated concrete layer in accordance with this invention will be described. This method comprises the first step of forming concrete layer with cement concrete, the second step of superposing aggregate on one side of the concrete layer before the concrete layer begins to cure thereby allowing the aggregate layer to be bound to the concrete layer, the third step of curing and drying the composite concrete layer formed of the concrete layer and the aggregate layer in the second step, the fourth step of impregnating the composite concrete layer with a monomer or prepolymer and polymerizing the monomer impregnated therein, and the fifth step of placing fresh concrete on the aggregate layer side of the composite concrete layer incorporating the polymer-impregnated concrete layer.

Figure 1:
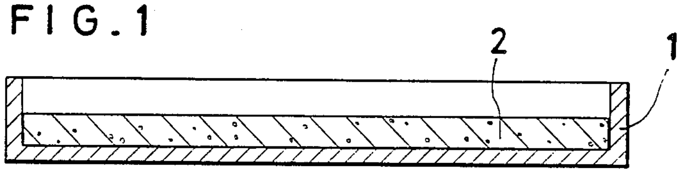
FIG. 1 is a cross section illustrating a concrete layer placed in a mold.

The procedure outlined above will be specifically described below with reference to the accompanying drawings. In the first step as typically illustrated in FIG. 1, ordinary concrete, resin concrete, or special concrete containing aggregate and sand is placed in a required thickness inside a mold 1 of prescribed dimensions to form a concrete layer 2. The thickness of this concrete layer 2 is to be decided in due consideration of the purpose for which the finally produced concrete structural member is used. Where the prevention of penetration by oxygen or moisture is the sole purpose, this thickness is not required to be appreciably large. Where the produced concrete structural member is intended to be used at a place exposed to runnng water as in a dam or an aqueduct, this thickness should be large enough to allow for wear by friction. If the thickness is increased more than is actually required, there ensues the economic disadvantage that the amount of the polymerizable monomer, an expensive raw material, to be used for the impregnation is proportionately increased. This placing of the concrete is facilitated by the use of a vibrator. Optionally, an expanded metal or lattice metal may be spread in advance on the bottom of the mold before the concrete is placed.

Figure 2:
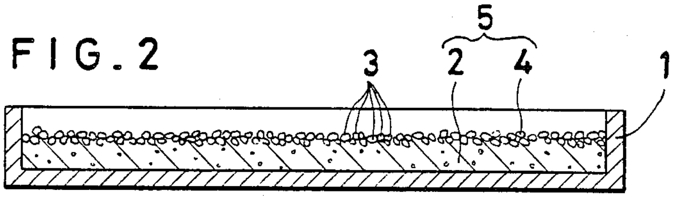
FIG. 2 is a cross section illustrating a layer of aggregate placed on the upper side of the concrete layer.

In the second step, aggregate 3 such as of gravel is scattered over the entire surface of the concrete layer 2 formed in the first step as illustrated in FIG. 2 before the concrete layer 2 begins to cure. As the aggregate, gravel roughly 5 to 30 mm in diameter can be advantageously used. When the aggregate is coated in advance with such adhesive agent as cement paste or resin paste, it exhibits improved adhesiveness to the underlying concrete layer 2. Since the aggregate 3 is spread on the concrete layer 2 while the concrete layer 2 is still in its uncured state as described above, part of the aggregate is embedded in the concrete layer and the individual grains of the aggregate 3 protruding from the surface of the concrete layer entrap gaps therebetween. After the aggregate has been scattered as described above, it may be pressed down when necessary to ensure submersion of part of the aggregate under the surface of the concrete layer. At the end of the second step, a composite concrete layer 5 having the concrete layer 2 on the one side and the aggregate layer 4 on the other side thereof is obtained.

In the third step, the aforementioned composite concrete layer 5 is caused by vibration or centrifugal force to take shape and then is hardened by using any of the known curing treatments such as curing in air, curing under water, or curing with steam. In consequence of this curing treatment, the composite concrete layer 5 is hardened with the concrete layer 2 and the aggregate layer 4 bound powerfully and intimately to each other. The composite layer 5 so cured is then dried by heating to remove the contained moisture.

Then in the fourth step, the aforementioned composite concrete layer 5 is impregnated with the monomer and the monomer embedded therein is transformed into the polymer by polymerization. As the monomer for use in this step, a composition of methyl methacrylate incorporating therein azo-bis-isobutyronitrile as a catalyst or a composition of styrene incorporating therein a cross-linking agent, a silane coupling agent, and the aforementioned catalyst in suitable amounts can be adopted.

The impregnation of the composite concrete layer 5 with the aforementioned monomer is effected most simply by merely soaking the composite concrete layer in a bath containing the monomer. Application of pressure on the bath containing the composite concrete layer is effective in accelerating the impregnation. Otherwise, the composite concrete layer may be placed in a tightly sealed container and then this container evacuated until the capillary pores in the concrete layer are vacuumized and, thereafter, the composite concrete layer impregnated with the monomer. This procedure ensures thoroughness of the impregnation and permits a saving in the time required for the treatment of impregnation. The impregnation time generally falls in the range of two to six hours. It substantially depends on the thickness of the composite concrete layer, particularly the concrete layer thereof.

After the monomer has fully impregnated the fine pores in the concrete layer 2 of the composite concrete layer and the gaps entrapped in the aggregate layer 4 in consequence of the aforementioned treatment for the impregnation of monomer, the monomer embedded therein is polymerized by exposure to radiation or thermal catalytic treatment. The heating temperature roughly falls in the range of 50° to 90° C. Water, water glass, steam, or other fluid of that sort is used as the heat medium. The polymerization time is roughly in the range of one to five hours. The heating temperature is decided by the size of the composite concrete member under treatment.

Figure 3:
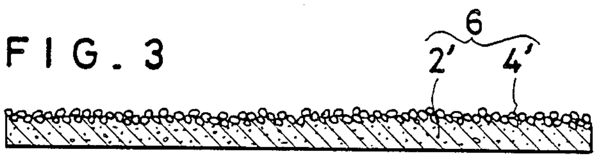
FIG. 3 is a cross section of a composite concrete member having a concrete layer on one side thereof and an aggregate layer on the other side thereof.

In consequence of the aforementioned treatment for the polymerization of monomer, the monomer which has passed into the fine pores in the concrete layer is transformed into a polymer. This polymer fills up the fine pores and the gaps and even hair cracks. Thus, the composite concrete layer is notably improved in quality both physically and chemically as compared with the conventional countertype produced by molding. The result of the treatments so far performed is depicted in FIG. 3. In the diagram, 2' denotes a polymer-impregnated concrete layer, 4' a polymer-impregnated aggregate layer, and 6 a composite concrete member provided with a polymer-impregnated concrete layer having the aforementioned two layers 2', 4' intimately bound to each other.

In the fifth step, conventional concrete, resin concrete, or some other concrete is placed neat on the aggregate layer 4' side of the composite concrete member 6 provided with the polymer-impregnated concrete layer. Consequently, there is obtained a concrete structural member provided at a desired position thereof with the polymer-impregnated concrete layer 2'.

Figure 4:
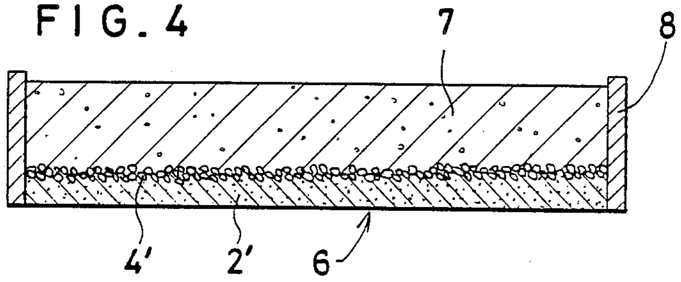
FIG. 4 is a cross section illustrating the manner in which a concrete structural member is molded in the shape of a slab by placing neat concrete on the composite concrete member of FIG. 3.
Figure 5:
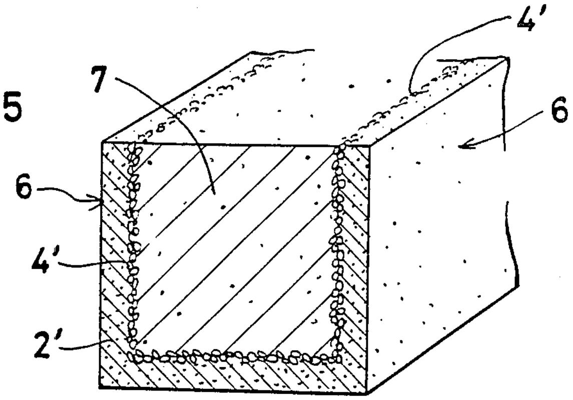
FIG. 5 is a perspective view illustrating the manner in which a concrete structural member is formed in the shape of a girder by using a composite concrete member.

Now, this step will be described with reference to FIG. 4. When the concrete structural member to be molded is in the shape of a slab, a polymer-impregnated composite concrete layer 6 is laid on the bottom part of the mold 8 so that the aggregate layer 4' will fall on the upper side. Then, fresh concrete is placed inside the mold 8 and left to cure. When the concrete structural member is to be molded in the shape of a beam or girder, as typically illustrated in FIG. 5, three composite concrete members 6 are joined in the shape of a channel of U-shaped cross section in such a manner that their aggregate layers 4' will all fall on the inside. Then, with these composite concrete members held in that state with suitable means such as props, concrete 7 is placed in the cavity of the channel and is left to cure. Consequently, there is obtained a concrete structural member of the shape of a beam or girder having the three outer sides thereof covered one each with polymer-impregnated concrete layers 2'. In this case, reinforcing bars or steel wires may be laid as reinforcement in the concrete 7 to give rise to a prestressed concrete.

As described above, in the former slab-shaped concrete structural member, one side thereof will be covered with the polymer-impregnated concrete layer 2'. In the latter concrete structural member which is in the shape of a long angular column, three of the four outer sides thereof will be covered with polymer-impregnated concrete layers 2'. In either of the concrete structural members cited above, one aggregate layer 4' is interposed along the boundary between the composite concrete layer 6 and the placed concrete 7. This aggregate layer which is impregnated with the polymer forms an extremely large boundary surface area with the concrete 7 owing to the rugged surface of the aggregate. Thus, the strength of the bond between the composite concrete member 6 and the concrete 7 is extremely high. The polymer-impregnated concrete layer 4' which enjoys outstanding physical and chemical properties lies on the surface and offers protection for the underlying concrete. Thus, the concrete structural member is enabled to retain its mechanical strength intact for a long time.

Figure 6:
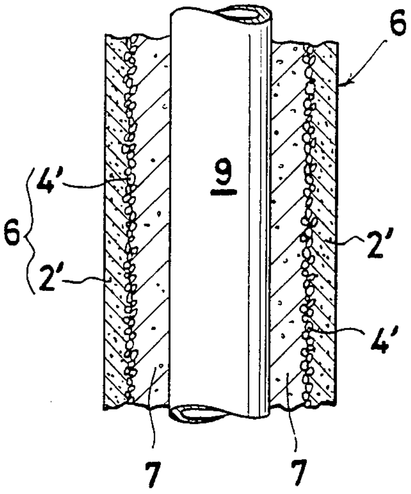
FIG. 6 is a cross section illustrating the manner in which a concrete structural member is formed in the shape of a cylinder column by using a cylindrical composite concrete member.

FIG. 6 typically illustrates the concrete structural member of this invention formed in the shape of a cylindrical column. A steel-pipe shaft 9 is disposed at the center and a concrete layer 7 is formed as wrapped around the shaft 9. A cylindrical composite concrete member 6 having a polymer-impregnated concrete layer 2' on the outer side and an aggregate layer 4' on the inner side thereof tightly encircles the outer periphery of the concrete layer 7.

Now, the general procedure adopted for the manufacture of this cylindrical concrete structural member will be described below. A cylindrical mold having a prescribed inside diameter is set in place on a rotary device. With the mold kept in rotation by the rotary device, concrete containing stated amounts of sand and aggregate is poured into the mold. By the centrifugal force, the concrete entering the mold is pressed against the internal surface of the mold. Before the tube of concrete formed inside the mold begins to harden, aggregate is uniformly spread over the entire internal surface of this tubular concrete. Naturally, part of the aggregate sinks in the underlying concrete. Then, the tubular composite concrete layer is dried and impregnated with the monomer in the manner already described. The monomer embedded in the tubular composite concrete layer is polymerized. Consequently, there is formed a tubular composite member 6 having the aggregate layer 4' on the inner side and the polymer-impregnated concrete layer 2' on the outer side thereof.

Then, a steel-pipe shaft 9 is concentrically inserted into the axial cavity of the tubular composite concrete member 6 and set fast in place by some suitable means. Concrete is poured into the annular gap formed between the internal surface of the concrete member 6 and the external surface of the steel-pipe shaft 9 and is left to cure to bind the opposed surfaces. Consequently, there is formed a cylindrical concrete structural member. Since the polymer-impregnated concrete layer covers the external surface of the concrete structural member as described above, it serves to repel invasion by moisture and oxygen and prevents the steel-pipe shaft from deterioration by rusting.

Figure 7:
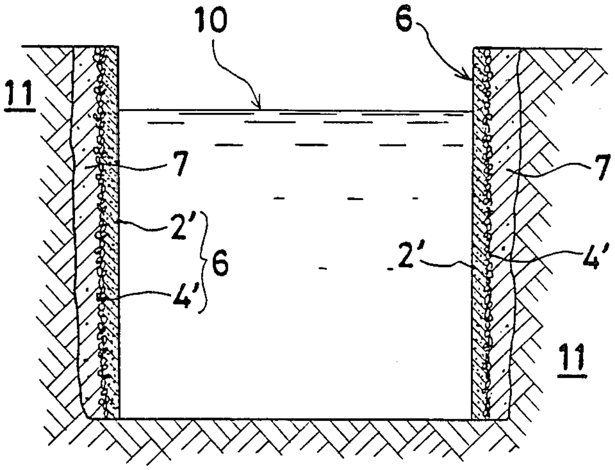
FIG. 7 is an explanatory diagram illustrating the manner in which a side wall in an aqueduct is built by using a composite concrete member.

So far the manufacture of the concrete structural member has been described as carried out at a plant. Now, the construction of the concrete structural member at the site of actual construction will be described specifically below. In an aqueduct such as a man-made canal, as typically illustrated in FIG. 7, two prefabricated composite concrete members 6 each having a polymer-impregnated concrete layer 2' formed on one side thereof are laid one each on the opposite lateral walls 11 of the aqueduct and set fast in place with the aid of frames. Then neat concrete is placed in the gaps occurring between the lateral walls 11 and the composite concrete members 6.

In this case, the composite concrete members 6 are places so that the aggregate layers 4' thereof will face the lateral walls 11. As a result, the concrete layers 7 and the composite concrete members 6 are powerfully bound to each other through the medium of the aggregate layers 4'. Naturally, the polymer-impregnated concrete layers 2' fall on the side exposed to running water. Thus, the polymer-impregnated concrete layers are disposed in the portion of the lateral retaining walls of an aqueduct or dam exposed to water. If plain concrete walls used where the water level rises and falls from time to time are invaded by water, the water in the concrete walls is frozen during the cold season. As this phenomenon is repeated, gradual erosion occurs on the surface of these concrete walls. When the polymer-impregnated concrete layers are exposed to the water, they do not suffer from this phenomenon because they repel the invasion by water.

Figure 8:
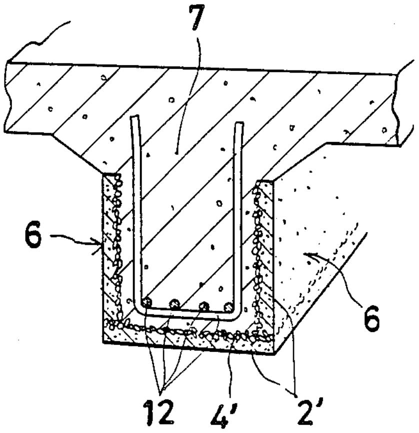
FIG. 8 is an explanatory diagram illustrating the manner in which a beam is built by using a composite concrete member.

FIG. 8 typically illustrates the manner in which a concrete beam is made at a site of actual construction. Along the inner surfaces of the walls of a frame (not shown) assembled at the site of construction, three composite concrete members 6 are joined in U-shpaed cross section, with the aggregate layers 4' thereof falling on the inside. In the cavity of the shape of a channel consequently formed, neat concrete 7 is placed optionally after reinforcing materials 12 such as steel wires or reinforcing bars have been disposed as required.

When a beam for use in a road near a coast is constructed as illustrated in FIG. 8, for example, the polymer-impregnated concrete layer 2′ prevents the sea water from penetrating the concrete. Thus, the reinforcing materials buried within the concrete 7 are not corroded and the road enjoys a long service life.

In accordance with this invention, the concrete is placed on the aggregate layer side of the polymer-impregnated concrete member to form powerful bond between the polymer-impregnated concrete layer and the concrete. Owing to this powerful bond, the joint boundary between the aforementioned concrete member and the concrete neither separates nor produces cracks even when the stress of contraction or tension is exerted to bear on the concrete structural member.

Moreover, the polymer-impregnated concrete layer is not readily affected by changes of moisture and temperature and the action of ultraviolet rays and it repels the penetration by moisture. Since it has virtually the same expansion coefficient as concrete, it is not separated from concrete when it is exposed to heavy changes of weather conditions. When the polymer-impregnated concrete layer is used only on the surface of the beam in a road in a coastal district, it protects the beam against invasion by chloride ion, oxygen, and moisture and protects the underlying reinforcing steel bars against corrosion. Thus, it enables the road to fulfill its role safely for a long time.

Further, the polymer-impregnated concrete layer excels in resistance to wear and offers moderate resistance to abrasion. When it is used on the paved surface of the road, it is not easily abraded or depressed even under heavy traffic. When the polymer-impregnated concrete layer is used in the overflow wall of a dam or weir which by nature is prone to heavy wear, it not only repels penetration by moisture but also precludes local erosion or abrasion by gravel and sand.

Since the polymer-impregnated concrete layer can be readily utilized only in the part of the concrete structural member which is in need of the particular functions of this concrete layer, this invention provides concrete structural members of excellent quality economically.

Now a working example of this invention will be cited below. This invention is not limited to the working example.

EXAMPLE

In a mold measuring 150 mm square and 30 mm in height, concrete having a W/C of 37% and a slump of 80 mm and containing aggregate 5 to 10 mm in grain size was poured to a thickness of about 10 mm, with the surface of the poured concrete smoothened and leveled. On the entire surface of the layer of concrete, aggregate 5 to 10 mm in grain size coated with cement paste was placed in such a manner that part of the aggregate would sink into and bond with the concrete. Consequently, there was obtained a composite member composed of a concrete layer about 15 mm in thickness and an aggregate layer about 10 mm in thickness.

Then, this composite member was hardened by curing with steam at 60° C. for four hours. It was then placed in a drier, there to be dried by heating at 150° C. for 12 hours. After this drying treatment, the composite was removed from the drier and left to cool spontaneously. It was immersed in a bath admixed with methyl methacrylate and azo-bis-isobutyronitrile as a catalyst and left standing therein at room temperature under atmospheric pressure for five hours to effect impregnation of the composite with the monomer. Subsequently, the composite so impregnated with the monomer was placed in a container filled with water glass and heated therein at 60° C. for five hours to effect polymerization of the monomer. Finally, it was washed with water.

Ten composites each consisting of a polymer-impregnated concrete layer and an aggregate layer and produced as described above were tested for compressive strength and modulus of rupture. Consequently, the average values of compressive strength and modulus of rupture were found to be about 1200 $kg/cm^2$ and about 240 $kg/cm^2$ respectively. The composite produced without the treatment of impregnation with the polymer for the purpose of comparison were tested for compressive strength and modulus of rupture. The average values thereof were found to be about 390 $kg/cm^2$ and about 49 $kg/cm^2$ respectively.

Subsequently, two composites similarly produced were placed as opposed to each other at a distance of 100 mm within a mold, with their aggregate layers falling on the inside. In the cavity formed between the aggregate layers, concrete having a W/C of 50% and a slump of 40 mm was placed and hardened by steam curing at 60° C. for four hours. The concrete structural member consequently obtained was left standing for 14 days. After this standing, it was subjected to a test for shearing between the aggregate layer and the concrete. In this test, only the concrete portion of the concrete structural member was mounted on a base 150 mm in length and 100 mm in width. A tool having a cross section of the shape of three sides of a square was lowered into the concrete structural member so as to apply pressure directly and simultaneously upon the two polymer-impregnated concrete composites. A total of three sample concrete structural members were thus tested for shear crack strength and shear rupture strength. The average values thereof were 30.3 $kg/cm^2$ and 52.7 $kg/cm^2$ respectively.

For comparison, a member identical in shape with the aforementioned composite was formed solely of concrete and subjected to the same test as described above. The average values of shear crack strength and shear rupture strength were found to be about 25 $kg/cm^2$ and about 71 $kg/cm^2$ respectively.

Separately, four polymer-impregnated concrete composites were joined after the pattern of the four sides of a square, with their aggregate layers falling on the inside. The corners were airtightly sealed with epoxy resin. The top and bottom openings were airtightly covered with iron lids.

Soap water was applied on the polymer-impregnated concrete layers on the four sides of the angular column and air pressure of 2 $kg/cm^2$ was applied on the interior of the angular column to test for air leakage from the angular column. Over a period of 24 hours, absolutely no air leakage was detected.

What is claimed is:

1. A method for the manufacture of a concrete structural member, which comprises:
   - forming in a mold a concrete layer of cement concrete of a prescribed thickness and with an upper surface,
   - placing aggregate on the entire upper surface of said concrete layer while said concrete layer is in an uncured state thereby giving rise to a composite concrete layer consisting of said concrete layer and an aggregate layer partly embedded therein, curing and drying said composite concrete layer and subsequently thoroughly impregnating said composite concrete layer with a monomer, polymerizing said monomer impregnated in said composite concrete layer to form a concrete member, and placing concrete on the aggregate layer side of said conctete member possessing said polymer-impregnated composite concrete layer to form said concrete structural member with said polymer-impregnated composite concrete layer forming a protective surface layer for said concrete structural member.

2. The method according to claim 1, wherein said aggregate to be placed on said concrete layer is coated with adhesive agent.

3. The method according to claim 1, wherein said monomer is methyl methacrylate or styrene.

4. The method according to claim 1, wherein said aggregate is gravel which has a diameter roughly ranging from 5 to 30 mm.

* * * * *

UNITED STATES PATENT AND TRADEMARK OFFICE
CERTIFICATE OF CORRECTION

PATENT NO. : 4,774,045

DATED : Sep. 27, 1988

INVENTOR(S) : Shizuko KUSHIDA et al.

It is certified that error appears in the above-identified patent and that said Letters Patent is hereby corrected as shown below:

On the Title Page:

Please add the following priority data:

-- Foreign Application Priority Data

Jul. 18, 1984 [JP] Japan ............ 59-107532
Jan. 29, 1985 [JP] Japan ............ 60-13455 --

Signed and Sealed this

Twenty-third Day of May, 1989

*Attest:*

DONALD J. QUIGG

*Attesting Officer* *Commissioner of Patents and Trademarks*